Dec. 27, 1960 C. W. WILLIAMS 2,966,595

PULSE SENSING SYSTEM

Filed Dec. 31, 1957

Inventor
Clifford W. Williams
by Edgar H. Kent
Atty.

United States Patent Office 2,966,595

Patented Dec. 27, 1960

2,966,595

PULSE SENSING SYSTEM

Clifford W. Williams, Kingston, N.Y., assignor to International Business Machines Corporation, New York, N.Y., a corporation of New York Filed Dec. 31, 1957, Ser. No. 706,398

5 Claims. (Cl. 307—88)

Figure 1:
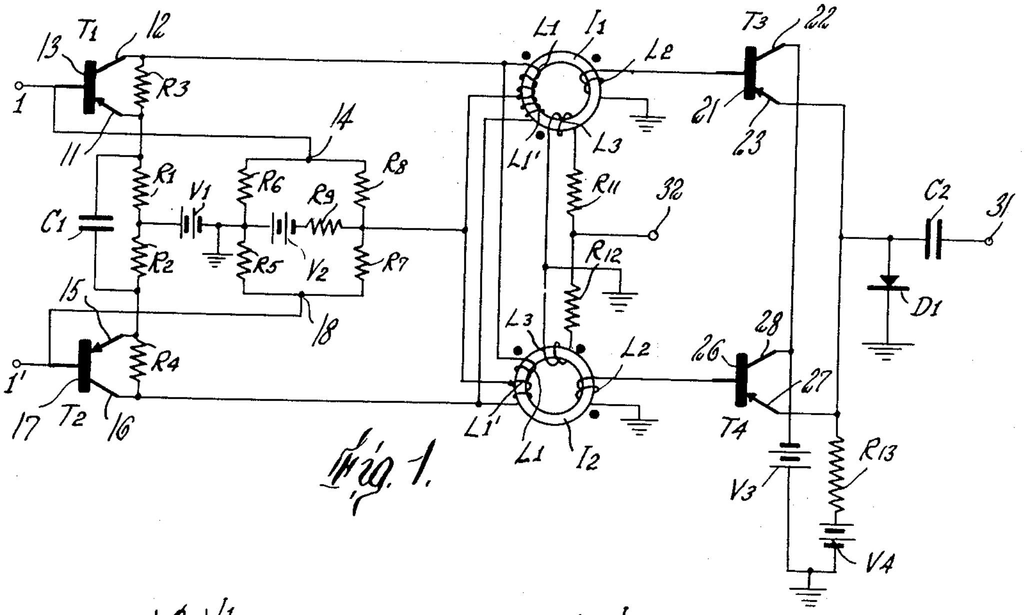

This invention relates to a system for sensing the occurrence of electrical pulses, particularly pulses of the type that are derived from a magnetic core storage device to represent digital information.

As is well known to those skilled in the art, a magnetic core storage device is a device which makes use of the bi-stable properties of certain magnetic core materials to store digital information in binary form. When it is desired to retrieve the information, the cores are sensed by a pulse of fixed polarity, and depending upon their initial states, either they will be caused to undergo substantial changes in state or their states will remain virtually unchanged. By means of suitable output windings on the cores, the changes in state are translated into pulses and the occurrence of a pulse in interpreted as a binary one. Conversely, those cores which do not undergo a change in state will be ineffective to produce pulses, the absence of which is interpreted as a binary zero. Storage devices of this kind are widely used in digital computing machines because their space requirements are relatively small, very little power is required to operate them, and they present virtually no maintenance problem. However, one problem with core storage devices is that the level of the information pulses derived therefrom is often insufficiently high to be readily detected in the presence of noise. That this is a real problem is evidenced by the fact that most present-day computing machines include very elaborate checking systems to indicate a malfunction of the machine or to correct it.

One expedient that is usually employed to minimize the effect of noise on the process of interpreting the output of a magnetic core storage device is a form of gate adapted to pass information pulses only for a very brief interval as compared with the duration of the pulses. To operate the gate, there are generally provided sampling pulses which occur at the times for occurrence of the information pulses. The present invention is directed to an improved system to produce an effective gating action in response to such sampling pulses. Although the system has been especially designed for use with a magnetic core storage device, it is by no means limited to this use since in principle its mode of operation is independent of the source of the pulses to be sensed.

In brief, the system according to the present invention includes a magnetic core, formed with a material which exhibits very little retentivity during the course of the operations to be described. The magnetization curve of the material has an initial portion, that is, a portion in the vicinity of the co-ordinates of the curve, which is of relatively shallow slope, and a succeeding intermediate portion, that is, a portion linking the initial portion with the knee of the curve where the material begins to saturate, that is of relatively steep slope. There are, in effect, three windings on the core, a primary winding, a secondary winding, and a tertiary winding. In response to an information or input pulse to be sensed, the primary winding is adapted to drive the core to a state corresponding to a point on the magnetization curve in the transitional region between the initial portion and the succeeding intermediate portion. The tertiary winding is coupled to a source of sampling pulses which, as aforementioned, are of relatively brief duration and are timed to occur during the intervals that the input pulses are to occur or not according to their binary sense. It follows that each time an input pulse does occur, the core will be driven by the sampling pulse beyond the state produced by the input pulse and into the region where an increase in magnetizing force is reflected in a relatively large change in flux density; namely where the magnetization curve is relatively steep. As a consequence, the sampling pulse causes the core to undergo, momentarily, a relatively large change in state, and this in turn is reflected in an output pulse of appreciable magnitude from the secondary winding. Conversely, each time an input pulse is absent when the sampling pulse occurs, there will be produced a relatively small change in the state of the core, since during the preceding interpulse period, the core will have reverted to a state corresponding to a point on the magnetization curve relatively close to its co-ordinate axes. Also, the magnetizing force produced by the sampling pulse is purposely made small enough so that the core is not driven appreciably beyond the transitional region of the curve in this case. As a consequence, the output pulse produced by the secondary winding will be so minute as to be readily distinguishable from the output pulse produced in the case where an input pulse is present.

In a preferred embodiment of the invention, actually there are two cores and their primary windings are connected to an input pulse amplifier or driver in a push-pull arrangement. One advantage of this scheme is that common mode voltages arising from spurious noise do not affect the states of the cores. Also the senses of the windings on the cores can be arranged so that input pulses of optional polarity can be accommodated.

An object of the invention, therefore, is to provide an improved system for sensing the occurrence of electrical pulses.

Another object of the invention is to utilize certain properties of magnetic cores to effect a form of gating action that is especially useful for the translation of digital information from a magnetic core storage device.

The novel features of the invention, together with further objects and advantages thereof, will become more readily apparent from the following detailed description and accompanying drawing of a preferred embodiment of the invention.

Figures 2A, 2B:
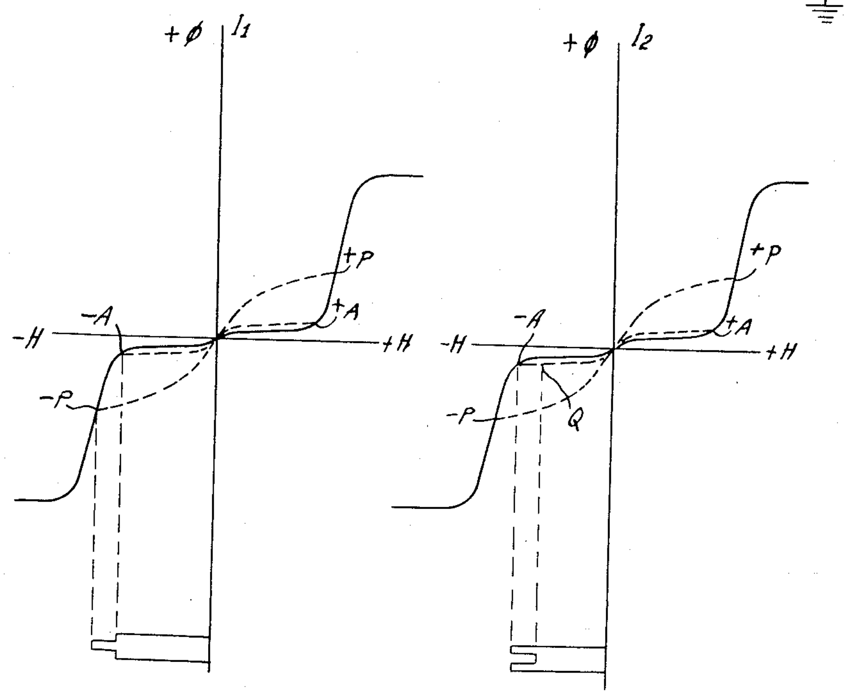

In the drawing:

Fig. 1 is a schematic diagram of a system according to the present invention; and Figs. 2*a* and 2*b* are plots of the magnetization curves of cores suitable for use in the system of Fig. 1.

In Fig. 1, to which reference will be had initially, there are shown a pair of magnetic cores I1 and I2, each having a primary winding comprised of two sections L1 and L1′, a secondary winding L2, and a tertiary winding L3. Connected between the primary windings and a pair of input terminals 1—1 for the pulses to be sensed is an amplifier or driver including a pair of PNP junction transistors. The transistors are arranged in push-pull fashion and utilize a common base mode of connection. More specifically, transistor T1 has an emitter 11 connected to the positive side of a supply voltage source V1 through a resistor R1; a collector 12 connected to the dot ends of the winding sections L1 on the cores I1 and I2; and a base 13 connected to both the input terminal 1 and a point 14 of negative biasing potential. The negative side of the voltage source V1 is connected to a common point or ground. Transistor T2 has an emitter 15 connected to the positive side of the voltage source V1 through a resistor R2; a collector 16 connected to the free end of the winding sections L1' on the cores I1 and I2; and a base 17 connected to both the input terminal 1' and a point of negative biasing potential 18. The biasing potentials are derived from a bias voltage source V2 and an associated resistance bridge including resistors R5, R6, R7 and R8. Source V2 has its positive side connected to ground and its negative side connected through a resistor R9 to the ends of the winding sections L1 and L1' which have a common junction. Resistors R7 and R8 are connected from this common junction to the respective base bias points 14 and 18; and resistors R5 and R6 are connected from the respective points 14 and 18 to ground. Finally, there is a by-pass condenser C1 connected between the emitters of the transistors T1 and T2, and a pair of resistors R3 and R4 connected from the emitters to the collectors, respectively.

The secondary windings L2 on the cores are effectively parallel coupled through a transistor amplifier including PNP junction transistors T3 and T4. Transistor T3 has its base 21 connected to the dot end of the secondary winding L2 on the core I1; its collector 22 connected to the negative side of a supply voltage source V3, and its emitter 23 connected to the positive side of a source of bias voltage V4 through a resistor R13. The other sides of the sources V3 and V4 are connected to ground. Transistor T4 has its base 26 connected to the no-dot end of the winding L2 on the core I2, and its emitter 27 and collector 28 connected in common, respectively, with the emitter and collector of transistor T3. In the load circuit of the transistors, that is between their emitters and ground, there is a diode D1 which performs a clipping function to be described more in detail hereinafter. Also, there is a coupling capacitor C2 to couple the emitters to an output terminal 31 from which a single ended output is derived from the system.

The tertiary windings L3 on the cores L1 and L2 are connected in parallel but in opposing relation to a source of sampling pulses (not shown) applied between a terminal 32 and ground. Specifically, the dot end of the winding L3 on the core I1 is connected to ground and the no-dot end is connected to terminal 32 through a resistor R11. Conversely, it is the no-dot end of the winding L3 on the core I2 that is connected to ground, the dot end being connected to the terminal 32 through a resistor R12.

With reference now also to Figs. 2*a* and 2*b* where there are shown the magnetization curves associated with cores I1 and I2, it will be observed that the curves for each core are the same, each having an initial (toe to instep) portion close to the co-ordinate axes of the curves which is of relatively shallow slope, and a succeeding intermediate portion of relatively steep slope, linking the initial portion with the knee of the curve. In the absence of either an input pulse or a sampling pulse, the cores revert to a state corresponding to a point on the curves relatively close to their co-ordinate axes as shown by the dotted lines. During this time current does flow through the winding sections L1 and L1' by way of transistors T1 and T2 and the resistors R3 and R4 but the current in the winding section L1 is balanced by the current in the winding section L1' so that no net magnetizing force is present. When an input pulse occurs (assuming input terminal 1 to be the positive terminal), the base potential of transistor T1 is raised and the base bias current decreased correspondingly, thereby decreasing the collector or output current flowing through the winding sections L1. Conversely, the input pulse lowers the potential of the base of transistor T2, permitting more base bias current to flow which increases the collector or output current through the winding sections L1'. The net effect of the currents in the primaries in this case is to produce a magnetizing force which, as shown in Figs. 2*a* and 2*b*, is adapted to drive the cores to a state corresponding to a point A on the curves in the transitional region between the shallow and steep portions. While the cores are in this state, a sampling pulse will be applied to the tertiary windings L3 of the cores by way of terminal 32 and ground (Fig. 1). The sampling pulse is of relatively brief duration as compared with the input pulse, and by way of example it may be in the order of one-tenth of a microsecond in duration as compared with one microsecond for the input pulse. The effect of the sampling pulse on the core I1 is to produce a magnetizing force in the same direction as that produced by the currents in winding sections L1 and L1' of core I1 but in the opposite direction to that produced in the core I2 by winding sections L1 and L1' of core I2. This is shown in Figs. 2*a* and 2*b* from which it will be observed that core I1 is driven by the sampling pulse beyond the state produced by the input pulse and into the region where the curve is relatively steep, for example to point P. Thus the core I1 will undergo an appreciable change in state which will be reflected in an output pulse of substantial magnitude from the secondary windings L2 of the core I1. The output pulse is amplified by the transistor T3 and passed to the output terminal 31. The diode D serves to clip the positive going portion of the pulse as is produced when the sampling pulse terminates. Core I2, on the other hand, undergoes a relatively small change in state, for example from P to Q in response to the sampling pulse as shown in Fig. 2*b*. Thus, the output from the secondary winding L2 will be relatively small and for all intents and purposes can be disregarded in this mode of operation, especially since its polarity will be the same as that of the output pulse from the core I1.

If it now be assumed that an input pulse is absent when a sampling pulse occurs, the effect of the latter will be to produce a relatively small change in the states of the cores. The reason is that during the preceding interpulse period, the cores will have reverted to a state corresponding to a point on the curves relatively close to their co-ordinate axes so that they will not be driven by the sampling pulse into the steep slope region. Hence the output from the secondary windings will be small as compared with the relatively large output pulse which is produced in response to both an input pulse and a sampling pulse.

In the case where the system is to be used with input pulses of reverse polarity, it will be apparent from the arrangement of the senses of the primary and tertiary windings that core I2 is adapted to produce a relatively large output pulse in response to contemporaneous input and sampling pulses, whereas core I1 will produce very little output. In other words, the net effect as viewed from the output terminal 31 will be precisely the same, the effective gating action in this case being produced by the core I2 instead of by the core I1.

A core material that is preferred for use according to the invention is perminvar whose characteristics are illustrated and described at pages 95 and 96 of the "Radio Engineer's Handbook" by Terman (1st ed.). Other materials can be used, however.

Also it will be appreciated that the basic principle of the invention can be applied in various other ways without departing from the spirit and scope of the invention. Therefore, the invention should not be deemed to be limited to the preferred embodiment in all its details, but should be deemed to be limited only to the scope of the appended claims.

What is claimed is:

1. In a system for sensing information in the form of an electric pulse of relatively long duration by means of a sampling pulse of relatively short coincident duration therewith, the combination of a magnetizable element, said element being normally in a state of substantially zero flux density and having a magnetization curve of initial gradual slope from said state of zero flux density and succeeding relatively steep slope and substantially no retentivity for flux of a density less than a given value corresponding to a point on the steep slope of said curve, means to apply said information pulse to the element as a first magnetizing force, when said element is in a state of substantially zero flux density, of such strength as to produce a relatively small flux density therein corresponding to a point on said curve below said steep slope, means to apply said sampling pulse as a second magnetizing force to the element of such strength as to produce, in combination with said first magnetizing force, a substantially greater flux density therein than said first force corresponding to a point on the steep slope of said curve, but of value less than said given value so that said low retentivity of the element causes the flux density therein to revert substantially to zero on release of said forces, and means for producing output signals in response to changes in the flux density in the region of steep slope of said curve of said element.

2. The combination as claimed in claim 1 wherein the first and second named means each comprises an input winding inductively associated with the element and the last named means comprises an output winding inductively associated with the element.

3. The combination as claimed in claim 2 wherein said first named means further includes an amplifier for said information pulse.

4. In a system for sensing information in the form of an electric pulse of relatively long duration by means of a sampling pulse of relatively short coincident duration therewith, the combination of an unsaturated core of magnetic material, said core having a magnetization curve of initial gradual slope from said state of zero flux density and succeeding relative steep slope and having low retentivity for induced flux of a density less than a given value corresponding to a point on the steep slope of said curve, input winding means on said core, means for connecting said winding means to sources of said information and sampling pulses, said winding means being so designed and constructed with reference to the strength of said pulses and the magnetic characteristics of said core as to apply said information pulse as a first magnetizing force to the core of such strength as to produce a relatively small flux density therein corresponding to a point on said curve below the region of said steep slope, and to apply said sampling pulse as a second magnetizing force to the core of such strength as to produce, in combination with said first magnetizing force, a substantially greater flux density therein than said first force corresponding to a point on the steep slope of said curve, but of value less than said given value so that said low retentivity of the core causes the flux density therein to revert substantially to zero on release of said forces, and output winding means on said core for producing output signals in response to changes in the flux density in said core.

5. A sensing system of the character described comprising first and second unsaturated cores of magnetic material having a magnetization curve which includes an initial portion and a succeeding intermediate portion of appreciably greater slope than said initial portion and having relatively low retentivity when the flux density therein is less than a given value, a pair of oppositely wound primary windings on each of said cores, a push-pull amplifier to apply to the primary windings on each core in response to a pulse, contemporaneous driving current pulses of opposite sense, and of sufficient amplitude to produce core states corresponding to a point on said curve in the transitional region between said portions, a secondary winding on each of said cores, a tertiary winding on one of said cores to produce a magnetizing force aiding said driving current pulses but having insufficient strength to produce in combination therewith, a flux density of more than said predetermined value, and a tertiary winding on the other of said cores to produce a magnetizing force opposing said driving current pulses when said cores are in said first-named state, said secondary windings producing selectively an output pulse in response to the changes in state of the cores according to the sense of the pulse to whcih said amplifier is responsive.

References Cited in the file of this patent

UNITED STATES PATENTS

| | | |
|---|---|---|
| 2,666,151 | Rajchman et al. | Jan. 12, 1954 |
| 2,691,155 | Rosenberg et al. | Oct. 5, 1954 |
| 2,709,248 | Rosenberg | May 24, 1955 |
| 2,736,880 | Forrester | Feb. 28, 1956 |
| 2,772,370 | Bruce et al. | Nov. 27, 1956 |
| 2,801,344 | Lubkin | July 30, 1957 |

OTHER REFERENCES

"Special-Purpose Digital Data-Processing Computers" by B. M. Gordon and R. N. Nicola, published May 2, 1952, "Proceedings of the ACM," pp. 33–45.